United States Patent
Mason

(10) Patent No.: US 9,896,615 B2
(45) Date of Patent: Feb. 20, 2018

(54) COMPOSITION FOR REMOVING NATURALLY OCCURRING RADIOACTIVE MATERIAL (NORM) SCALE

(71) Applicant: FQE CHEMICALS INC., Calgary (CA)

(72) Inventor: Douglas J. Mason, Sugar Land, TX (US)

(73) Assignee: FQE Chemicals Inc., Calgary (*) Notice: Subject to any disclaimer, the term of this patent is extended or adjusted under 35 U.S.C. 154(b) by 0 days.

(21) Appl. No.: 15/142,675

(22) Filed: Apr. 29, 2016

(65) Prior Publication Data

US 2017/0313927 A1    Nov. 2, 2017

(51) Int. Cl.
| | | |
|---|---|---|
| *C09K 8/528* | (2006.01) | |
| *C11D 7/32* | (2006.01) | |
| *C11D 11/00* | (2006.01) | |
| *C11D 7/10* | (2006.01) | |

(52) U.S. Cl.
CPC ............... *C09K 8/528* (2013.01); *C11D 7/10* (2013.01); *C11D 7/3209* (2013.01); *C11D 7/3245* (2013.01); *C11D 11/0041* (2013.01)

(58) Field of Classification Search
None
See application file for complete search history.

(56) References Cited

U.S. PATENT DOCUMENTS

| | | | |
|---|---|---|---|
| 3,896,045 A | | 7/1975 | Peeters et al. |
| 3,949,047 A | | 4/1976 | Cherdron et al. |
| 4,146,568 A | | 3/1979 | Lange, Jr. |
| 4,190,462 A | | 2/1980 | De Jong et al. |
| 4,215,000 A | | 7/1980 | De Jong et al. |
| 4,328,193 A | | 5/1982 | Larson |
| 5,068,042 A | | 11/1991 | Hen |
| 5,207,532 A | | 5/1993 | Mason et al. |
| 5,489,735 A | | 2/1996 | D'Muhala |
| 5,550,313 A | | 8/1996 | Hayden |
| 5,824,159 A | | 10/1998 | Tate |
| 6,924,253 B2 | | 8/2005 | Palmer et al. |
| 7,343,978 B2 | | 3/2008 | John et al. |
| 7,470,330 B2 * | | 12/2008 | Keatch ............... C01F 11/462 134/2 |

OTHER PUBLICATIONS

Abass A. Olajire, "A review of oilfield mineral scale deposits management technology for oil and gas production", Journal of Petroleum Science and Engineering, Nov. 2015.

(Continued)

*Primary Examiner* — Jeffrey Washville

(57) ABSTRACT

A composition is provided for the treatment of scaling and deposits due to naturally occurring radioactive material, said composition comprising one or more extractants that preferentially attract radioactive isotopes over other forms of alkaline earth cations A composition is further provided wherein said composition forms a polydentate ligand with one or more metals to act as carriers for radioactive elements. The composition comprises components that enhance stabilization of coordination complexation of the radioactive isotopes in the formation of polydentate ligands.

12 Claims, 1 Drawing Sheet

(56) References Cited

OTHER PUBLICATIONS

Mackay, J.E., "Scale inhibitor application in injection wells to protect against damage to production wells". Proceedings of the SPE European Formation Damage Conference, May 25-27, 2005, Scheveningen, Netherlands, pp. 1-9.
Kelland A. M., Production Chemicals for the Oil and Gas Industry, 2014.
M. Crabtree, D. Eslinger, P. Fletcher, A. Johnson, and G. King, "Fighting Scale-Removal and Prevention." Oilfield Review (Schlumberger) 11 (1999):30.
Tomson, M. B., Kan, A. T., Fu, G. & Al-Thubaiti, M., "NORM Scale Formation, Control, and Relation to Gas Hydrate Control." Proceedings of 10th International Petroleum Environmental Conference (IPEC) (2003).

* cited by examiner

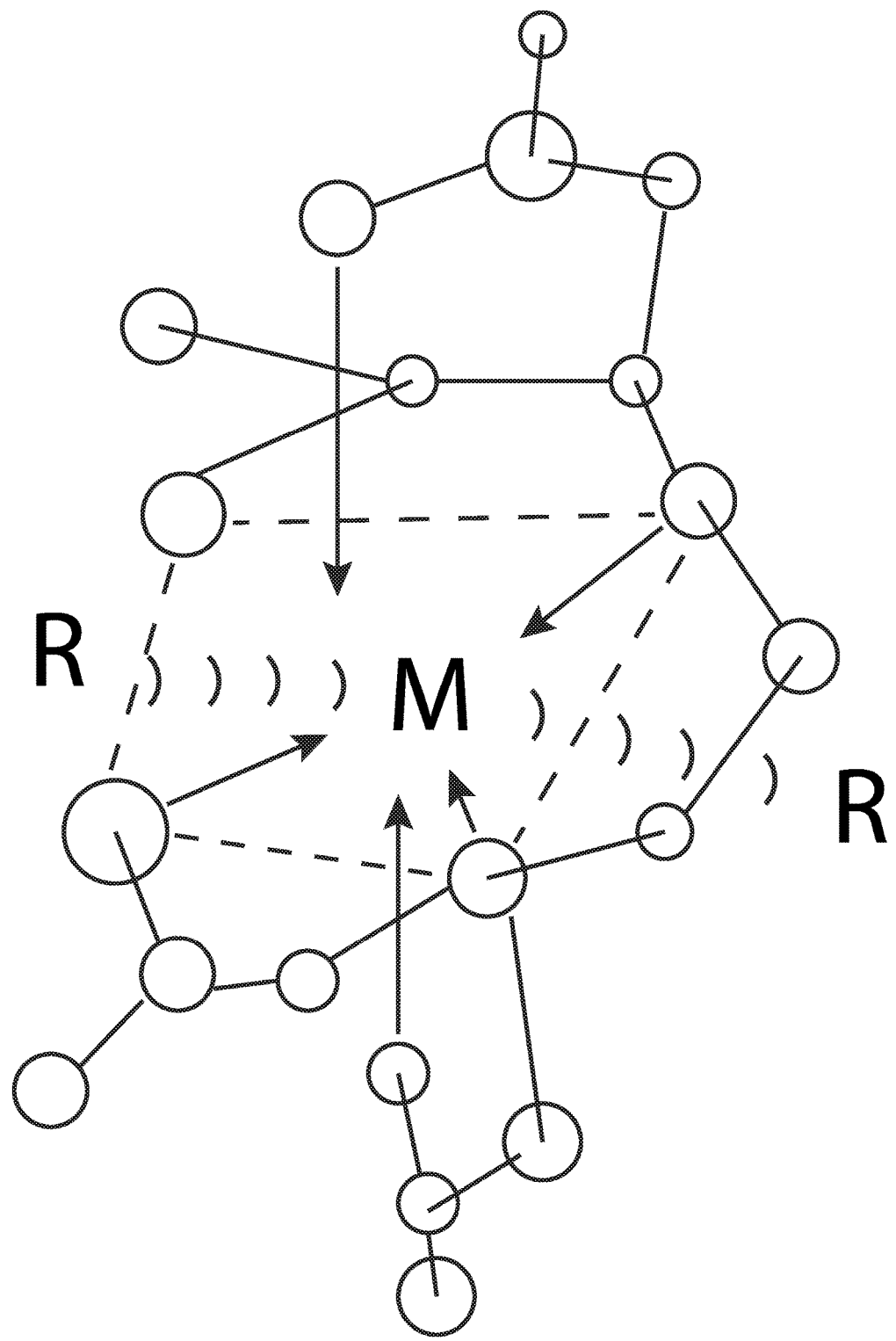

COMPOSITION FOR REMOVING NATURALLY OCCURRING RADIOACTIVE MATERIAL (NORM) SCALE

BACKGROUND OF THE INVENTION

In recent years, oil and gas producers have employed new methods to reach otherwise inaccessible oil and gas formations and to enhance stimulation. These new methods, some of which include hydraulic fracturing, can result in the production of increased amounts of radioactive wastes. Geologic formations that contain oil and gas deposits also contain naturally-occurring radionuclides, which are referred to as Naturally Occurring Radioactive Materials (NORM). NORM contamination is typically encountered as a complex mixture of inorganic scales plated on the equipment surface.

Because the extraction process concentrates the naturally occurring radionuclides and exposes them to the surface environment and human contact, these wastes are classified as Technologically Enhanced Naturally Occurring Radioactive Material (TENORM). TENORM is a significant problem in the petroleum industry.

Highly mineralized formation waters contain highly radiotoxic Radium isotopes from Uranium decay and from Thorium decay. Primary concerns in oil production are radium-226 and radium-228 nuclides. They decay into various radioactive progeny, before becoming stable lead. Radium-226 belongs to the Uranium-238 decay series and Radium-228 to the Thorium-232 decay series. These radium isotopes appear in the water produced with oil and gas production. These toxic isotopes, amongst others, deposit on surface equipment such as downhole tubulars, surface vessels, pumps, valves, separators and others, as scale and sludge.

Sulfate scales are formed when formation water is mixed with injected sea water. Many subterranean waters contain alkaline earth metal cations, such as barium, strontium, calcium and magnesium. Sea water has high concentration of $SO_4^{2-}$ and formation waters, with high concentrations of $Ca^{2+}$, $Ba^{2+}$ and $Sr^{2+}$. The injection of seawater into oilfield reservoirs is necessary to maintain reservoir pressure and improve secondary recovery. When two incompatible waters are mixed such as seawater and formation water and interact chemically, a precipitate (scale) is formed. Two waters are called incompatible if they interact chemically and precipitate minerals when mixed. Mixing of these waters, therefore, could cause precipitation of $CaSO_4$, $BaSO_4$ and $SrSO_4$. When the concentrations of the barium and sulfate ions exceed the solubility product of barium sulfate, a solid phase of barium sulfate will form as a precipitate. Radium is chemically similar to barium (Ba), strontium (Sr) and calcium (Ca), hence radium co-precipitates with Sr, Ba or Ca scale forming radium sulfate, radium carbonate.

The most common NORM containing scales are barium sulfate $BaSO_4$, since radionuclide do not precipitate directly, but are incorporated in to the crystal lattice in the barium sulfate scale causing the scale to be radioactive. Strontium sulfate co-precipitates radium in a similar way to barium sulfate but less completely. Of all the alkaline earth sulfates, radium sulfate is the least soluble. The concentration of radium in the brine is not high, but once precipitated in scale deposits, radiation level can be higher than regulated limits.

As these reaction products precipitate on the surfaces of the water-carrying or water-containing system, they form adherent deposits or scale. Scale may prevent effective heat transfer, interfere with fluid flow, facilitate corrosive processes, or harbor bacteria. Scale is an expensive problem in many industrial water systems, in production systems for oil and gas, in pulp and paper mill systems, and in other systems, causing delays and shutdowns for cleaning and removal.

It is generally acknowledged that barium sulfate scale is extremely difficult to remove chemically, especially within reasonably short periods of time: the solvents which have been found to work generally take a long time to reach an equilibrium concentration of dissolved barium sulfate, which itself is usually of a relatively low order. Consequently, barium sulfate must be removed mechanically or the equipment, e.g. pipes, etc., containing the deposit must be discarded.

The scale may occur in many different places, including production tubing, well bore perforations, the area near the well bore, gathering lines, meters, valves and in other production equipment. Barium sulfate scale may also form within subterranean formations such as in disposal wells. Scales and deposits can be formed to such an extent that the permeability of the formation is impaired resulting in lower flow rates, higher pump pressures, and ultimately abandonment of the well.

Various approaches are used to fight equipment scaling from prediction (using software simulations), prevention of scale crystal growth, mechanical removal and chemicals solution (to dissolve scale deposits) the first two methods are called proactive and the latter-reactive approaches.

Scale inhibitors are designed to block the scale crystal growth or by chelating or keeping reactants in soluble form. These treatments are sensitive to the changes in production systems resulting in failing efficiency. In addition, chelants have high cost constraint. Most scale inhibitors are phosphate compounds: inorganic polyphosphates, organic phosphate esters, organic phosphonates, organic amino-phosphates, and organic polymers. They are retained in the formation either by adsorbing to the pore walls or precipitating in the pore spaces, and have lifetime ranging from 3 months to 2 years.

Explosives have been used to rattle pipes and break off brittle deposits, but can cause excessive damage in the system.

Water jetting is effective on soft scale while, but its less effective on hard scale such as barite. Adding small concentration of solid such as sand or glass beads can promote scale removal, but can damage the tubular walls.

Typical equipment decontamination processes have included both chemical and mechanical efforts, such as milling, high pressure water jetting, sand blasting, cryogenic immersion, and chemical chelants and solvents. Water jetting using pressures in excess of 140 MPa (with and without abrasives) has been the predominant technique used for NORM removal. However, use of high pressure water jetting generally requires that each pipe or piece of equipment be treated individually with significant levels of manual intervention, which is both time consuming and expensive, but sometimes also fails to thoroughly treat the contaminated area.

Primarily one class of chemicals is consistently used for dissolving hard barium scale, and is diethylenetriamine pentaacetic acid (DTPA). While chemical chelants, such as EDTA (ethylenediaminetetraacetic acid) or DTPA, have long been used to remove scale from oil field equipment, once EDTA becomes saturated with scale metal cations, the spent solvent is generally disposed of, such as by re-injection into the subsurface formation. However, because the process requires that disposal of the solvents once saturated, the large amounts of a fairly expensive solvent necessary for decontamination renders the process economically prohibitive.

U.S. Pat. Nos. 4,215,000 and 4,190,462 and 6,924,253 reveal new barite scale dissolvers. U.S. Pat. No. 5,824,159 aims to treat NORM scale (once removed from the equipment and stored) by separating/extracting alkaline earth metal scales, particularly barium sulfate and strontium sulfate (with entrained NORM) into aqueous solution. The process is done at temperature range: 150-200 F. U.S. Pat. No. 7,470,330 B2 exposes the scale to the chelating agent (EDTA), to cause the scale to dissolve by complexing with the alkaline earth metal of the scale salt. Once the chelating agent becomes saturated with the metal cations from the scale, the solution is acidified increasing the availability of anions with which the sequestered cations may react and allowing the cations to be released from the chelated complex to form an insoluble salt that will precipitate out of solution.

SUMMARY

A composition is provided for the treatment of scaling and deposits due to naturally occurring radioactive material, said composition forming one or more attractants that preferentially attract radioactive elements over other alkaline earth cations. A composition is further provided wherein said attractants take the form of polydentate ligands with one or more central metal groups that act as carriers for radioactive elements. The provide composition comprises, one or more metallic salts, one or more chelating agents that act synergistically to aid in polydentate ligand formation and one or more carboxylic acids that enhance stabilization of coordination complexation in the formation of polydentate ligands It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention.

BRIEF DESCRIPTION OF THE DRAWINGS

A further, detailed, description of the invention, briefly described above, will follow by reference to the following drawings of specific embodiments of the invention. The drawings depict only typical embodiments of the invention and are therefore not to be considered limiting of its scope. In the drawings:

FIG. 1 is an illustration of a chemical structure of a polydentate ligand.

The drawing is not necessarily to scale and in some instances proportions may have been exaggerated in order more clearly to depict certain features.

DETAILED DESCRIPTION OF VARIOUS EMBODIMENTS

The description that follows and the embodiments described therein are provided by way of illustration of an example, or examples, of particular embodiments of the principles of various aspects of the present invention. These examples are provided for the purposes of explanation, and not of limitation, of those principles and of the invention in its various aspects.

The present invention relates to chemical products for removal of deposits and scaling from Naturally Occurring Radioactive Material (NORM) on oil and gas equipment such as downhole tubulars, surface vessels, pumps, valves, separators and others, as scale and sludge.

The complexation of radium, and other radioactive compounds, in the presence of other alkaline earth cations ($Na^+$, $K^+$, $Mg^{2+}$, $Ca^{2+}$, $Sr^{2+}$, and $Ba^{2+}$) that are in large excess is problematic, since $Ra^{2+}$ has the lowest tendency to form complexes. Since $Ra^{2+}$ cations are divalent, the charge must be compensated to form neutral complexes.

The present invention provides a decontamination composition for the removal of NORM from surface contaminated equipment. In the present invention, the composition is successfully complexed into polydentate ligands that serve to attract radioactive elements and capture them.

It has been discovered that mixtures of chelating or sequestering agents such as polyamino carboxylic acids, and salts thereof, act to enhance coordination complexation. Additionally, it has been found that smaller molecular size carboxylic acids that are non-nitrogenous, and salts thereof, act synergistically in the stabilization of the formation of polydentate ligands with metals that are otherwise difficult to complex.

These chelating or sequestering agents show a synergistic effect in the complexation of radioactive elements into polydentate ligands and in the smaller molecular size carboxylic acids then enhance stabilization of this coordination complexation.

In the present invention, the choice of composition elements leads to a composition designed for the preferential attraction of $Ra^{2+}$ and other elements such as alkaline earth cations $Na^+$, $K^+$, $Mg^{2+}$, $Ca^{2+}$, $Sr^{2+}$, and $Ba^{2+}$, of which a significant excess exists. Of all the alkaline earth elements, $Ra^{2+}$ is the most challenging, because it has lowest affinity for complex formation.

With reference to FIG. 1, this invention relates to compositions that aid in the formation of polydentate ligands, illustrated by the structure in general, with various metals, represented by M, forming the central metal that act as attractant for radioactive elements, represented by R, and specifically radium. In coordination chemistry, a ligand is an ion or molecule (that is, a functional group) that binds to a central metal atom to form a coordination complex. Ligands with more than one bonded atom are called polydentate or multidentate. Polydentate ligands range in the number of atoms used to bond to a central metal atom or ion. EDTA, a hexadentate ligand, is an example of a polydentate ligand that has six donor atoms with electron pairs that can be used to bond to a central metal atom or ion.

Preferably, in the present invention, the metal can be chosen from elements of Group IIA alkaline metal earths and Groups VB, VIB, VIIB and VIIIB transition metals that may be functional to attract radium when complexed as a polydentate ligand.

Unlike many prior art methods of radioactive element removal, in which metals take the form of solids in packed beds, the present metals are provided in metallic salt form, as a liquid or solution, that readily react with the chelating or sequestering agents to create polydentate ligands, which can then act as attractants for capture of radioactive elements.

These metals are low on the electromotive series of the tendency of a chemical species to gain or lose electrons.

They therefore have similar tendencies as do the radioactive isotopes with respect to how easily they are oxidized. They are similarly difficult to complex and tend to destabilize and separate, leading to the metals would falling out of solution and re-depositing on the surface of equipment.

Hence the need for stabilization. Chelating or sequestering agents have a tendency to form ligands with metals that have higher Log K values, where K is the stability constant or formation constant of the metal, and with metals that are higher on the electromotive series. However, the inventors have found that by addition of a small molecular weight carboxylic acid, the coordination complexation and formation of the ligand with the present set of metals, that have an affinity to radioactive elements, is stabilized. In formation of the ligand, reactive sites of the chelating agent are now occupied, and the chelating agent is prevented from forming a ligand with other metals that have higher Log K values.

The exact mechanism of attraction between complexed metal and radium is unknown, however, it is believed that the similarity of the electron configurations of the outermost atomic shells may provide insight. While radium has the least tendency of all the alkaline metal earth metals to form complexes, radium is attracted to other electronically configured metals that are.

The composition of the present invention comprises from about 10 to about 50 percent by weight of a mixture of a chelating agent which is preferably a polyamino carboxylic acid. The polyamino carboxylic acids more preferably include but are not limited to ethylenetriaminetetraacetic acid (EDTA), diethylenetriaminepentaacetic acid (DTPA), polyaspartic acid (PAA), iminodisuccinic acid (IDSA), methylglycinediacetic acid (MGA) and alkali metal salts and ammonium salts thereof.

The present invention further comprises from about 1 to about 20 percent by weight of a small molecule carboxylic acid selected from the group consisting of alkali metal salts and ammonium salts of carboxylic acids selected from ascorbic acid, citric acid, glutamic acid, thioctic acid and alpha-lipoic acid.

A neutralizing compound may optionally be used to form the salts of the polyamino carboxylic acids and carboxylic acids. While any number neutralizing compounds, such as alkali metal hydroxides, may be used to form the salts of the polyamino carboxylic acids and carboxylic acids, potassium salt is most preferred.

The present invention further comprises 1 to 10 percent of a metallic salt in liquid form that is preferably selected from the group consisting of Group IIA and Groups VB, VIB, VIIB and VIIIB and salts thereof. More preferably, metals which are good carriers for radium are barium, molybdenum, vanadium, manganese and iron.

The present compositions have been seen to be successful in the removal of $BaSO_4$, $RaSO_4$, and/or $SrSO_4$ deposits and scale, and more particularly barium sulfate scale containing radium sulfate $Ba(Ra)SO4$.

The present chemical compositions are preferably water (aqueous) based. In application, a NORM contaminated surface is contacted with the described composition. The treatment liquid is applied by any convenient circulation mechanism at a temperature range of 100° F. to 200° F. Preferably the pH of the circulating liquid of is in the range 9 to 13. An alkali environment can be created preferably by the addition of potassium hydroxide, more preferably a 30 to 50% by weight solution of potassium hydroxide. The present chemical compositions are preferably clear liquids that are water soluble, non-combustible, biodegradable and non-hazardous by common North American safety and environment standards.

The additional dilution and rate of application of the present chemical compositions will vary with the severity and nature of the scale deposits.

This invention may, however, be embodied in many different forms and should not be construed as limited to the embodiment set forth above. It will be recognized by those skilled in the art that other suitable polyamino carboxylic acids and chelating agents may be interchanged for those materials herein disclosed. In the preferred embodiment, the polydentate ligand is formed using manganese (II) sulfate as the metallic salt. However, other suitable metal ligands can be created from the present compositions and would be well understood by a person of skill in the art as also being functional as radium and other radioactive element attractants.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A composition for attracting radioactive salts from scale deposits due to naturally occurring radioactive material, said composition forming one or more attractants in the form of polydentate ligands with one or more central metal groups that act as carriers for radioactive elements that preferentially attract radioactive elements over other alkaline earth cations.

2. The composition of claim 1, comprising, one or more metallic salts to form the one or more central metal groups, one or more chelating agents that complex with the one or more metallic salts in polydentate ligand formation, and one or more carboxylic acids that enhance stabilization of coordination complexation in the formation of the polydentate ligands.

3. The composition of claim 2, wherein said one or more metallic salts are metallic salts in liquid form selected from the group consisting of Group IIA alkaline metal earths, Groups VB, VIB, VIIB and VIIIB transition metals and combinations thereof.

4. The composition of claim 3, wherein said one or more metallic salts are selected from the group consisting of barium, molybdenum, vanadium, manganese, iron and combinations thereof.

5. The composition of claim 4, wherein said one or more chelating agents are polyamino carboxylic acids.

6. The composition of claim 5 wherein said one or more polyamino carboxylic acids are selected from the group consisting of ethylenetriaminetetraacetic acid, diethylenetriaminepentaacetic acid, polyaspartic acid, iminodisuccinic acid, methylglycinediacetic acid (MGA), alkali metal salts thereof and ammonium salts thereof.

7. The composition of claim 6, wherein said one or more carboxylic acids are small molecular size carboxylic acids.

8. A method for treating scaling and deposits due to naturally occurring radioactive material, said method comprising the steps of:
   a. complexing one or more metallic salts with one or more chelating agents to form one or more polydentate ligands with one or more central metal groups;
   b. adding one or more carboxylic acids to the complex to at least enhance stabilization of complexation of the polydentate ligands; and
   c. attracting one or more radioactive elements to the central metal groups of the polydentate ligand, wherein the radioactive elements are preferentially attracted over other alkaline earth cations.

9. The method of claim 8, wherein formation of the polydentate ligand, serves to occupy reactive sites of the chelating agent and prevents the chelating agent from forming a ligand with other alkaline earth cations.

10. The method of claim 8, wherein said one or more metallic salts are metallic salts in liquid form selected from the group consisting of Group IIA alkaline metal earths, Groups VB, VIB, VIIB and VIIIB transition metals and combinations thereof.

11. The method of claim 8, wherein said one or more chelating agents are polyamino carboxylic acids.

12. The method of claim 8, wherein said one or more carboxylic acids are small molecular size carboxylic acids.

* * * * *